(12) United States Patent  (10) Patent No.: US 7,679,360 B2
Schmidt et al.  (45) Date of Patent: Mar. 16, 2010

(54) METHOD FOR INITIALIZING INCREMENT POSITION SENSOR

(75) Inventors: Jeremy Schmidt, Chatham (CA); Mark Cronmiller, White Lake, MI (US)

(73) Assignee: Continental Automotive Systems US, Inc., Auburn Hills, MI (US)

( * ) Notice: Subject to any disclaimer, the term of this patent is extended or adjusted under 35 U.S.C. 154(b) by 864 days.

(21) Appl. No.: 11/374,439

(22) Filed: Mar. 13, 2006

(65) Prior Publication Data

US 2006/0202680 A1    Sep. 14, 2006

Related U.S. Application Data

(60) Provisional application No. 60/661,632, filed on Mar. 14, 2005.

(51) Int. Cl.
*G01R 35/00* (2006.01)
*G01P 13/00* (2006.01)

(52) U.S. Cl. .................. 324/202; 324/173; 324/165

(58) Field of Classification Search ............ 324/207.25, 324/207.2, 202, 165, 173; 701/101, 114; 318/434, 446, 445, 478; 123/90.15–90.17, 123/179.4–179.5, 406.61–406.62
See application file for complete search history.

(56) References Cited

U.S. PATENT DOCUMENTS

| 3,838,638 | A | * | 10/1974 | Clary ................. 101/93.22 |
| 4,931,940 | A | | 6/1990 | Ogawa et al. |
| 6,411,375 | B1 | | 6/2002 | Hinkle et al. |
| 6,681,173 | B2 | | 1/2004 | Turner et al. |
| 2002/0100442 | A1 | | 8/2002 | Takahashi et al. |
| 2003/0079701 | A1 | | 5/2003 | Riedle et al. |

FOREIGN PATENT DOCUMENTS

WO    WO 2004/038201 A1    5/2004

\* cited by examiner

*Primary Examiner*—Reena Aurora

(57) ABSTRACT

An increment sensor assembly inquires an microcontroller as to the last known increment when a vehicle is started. The last known increment data is used to rotate the sensor backward to reach a lower mechanical stop position or forward to reach an upper mechanical stop position. A timer tracks the sensor to ensure that one of the known stop positions is reached within a predetermined time period or performs a system check to determine what error has occurred. Once the sensor reaches one of the known stop positions an increment counter is reset and the sensor assembly begins normal operation.

20 Claims, 3 Drawing Sheets

METHOD FOR INITIALIZING INCREMENT POSITION SENSOR

The present invention claims the benefit of U.S. Provisional Patent Application No. 60/661,632, filed Mar. 14, 2005.

BACKGROUND OF THE INVENTION

This invention relates to an improved system for initializing a position sensor for an engine actuator. More particularly, this invention relates to initializing an incremental position sensor based upon the last know location of the sensor.

Intake manifolds control airflow into a vehicle engine to modify engine performance. Engine actuators are used to control valves within the intake manifold. The valves modify air flow characteristics to enhance engine performance in terms of either fuel economy or torque output. A sensor measures the rotational position of an engine actuator output shaft to determine the position and speed of the valves. The position information is sent to an engine controller which uses the information to adjust the valves. Absolute and increment position sensors are utilized for determining the engine actuator speed and position.

Currently, to provide accurate information the increment sensor must be initialized each time the system starts. The system does not know what position the increment sensor is at start up. The sensor must be moved to a known location prior to normal operations. Known systems rotate the output shaft to move the sensor and valves back to a default start or zero position prior to beginning normal sensor operations.

However, moving the sensor and valves to a default position can create undue movement of the sensor and valves and provides little information to the system regarding the sensor assembly. It is therefore desirable to develop and design an improved arrangement for initializing a position sensor to provide feedback to the system.

SUMMARY OF THE INVENTION

An example sensor assembly according to this invention uses an incremental position sensor that is initialized based upon a last know location of the position sensor.

The sensor assembly senses the position and speed of an engine actuator output shaft to control the position of valves within an intake manifold. The sensor assembly cannot begin normal operations of counting increments until in a known position. When the vehicle is started, power is provided to the sensor assembly and a microcontroller. The microcontroller receives from the engine controller the last known position. The last known position data is used to rotate the sensor toward a mechanical stop position.

A timer tracks the sensor to ensure that the known stop position is reached within a predetermined time period. If the sensor is still moving after the predetermined time period, a system check is performed to determine what error has occurred. Once the sensor reaches the known stop position, an increment counter is reset and the sensor assembly begins normal operation.

The microcontroller can override initialization of the sensor assembly when a vehicle engine is at a predetermined temperature to allow the components of the intake manifold to reach desired positions prior to initialization. The override of the sensor assembly initialization reduces unnecessary movement for initializing that is immediately followed by moving the actuator to adjust the intake manifold components. Once the intake manifold components reach the desired position the sensor assembly is initialized.

These and other features of the present invention can be best understood from the following specification and drawings, the following of which is a brief description.

DETAILED DESCRIPTION OF THE PREFERRED EMBODIMENT

Figure 1:
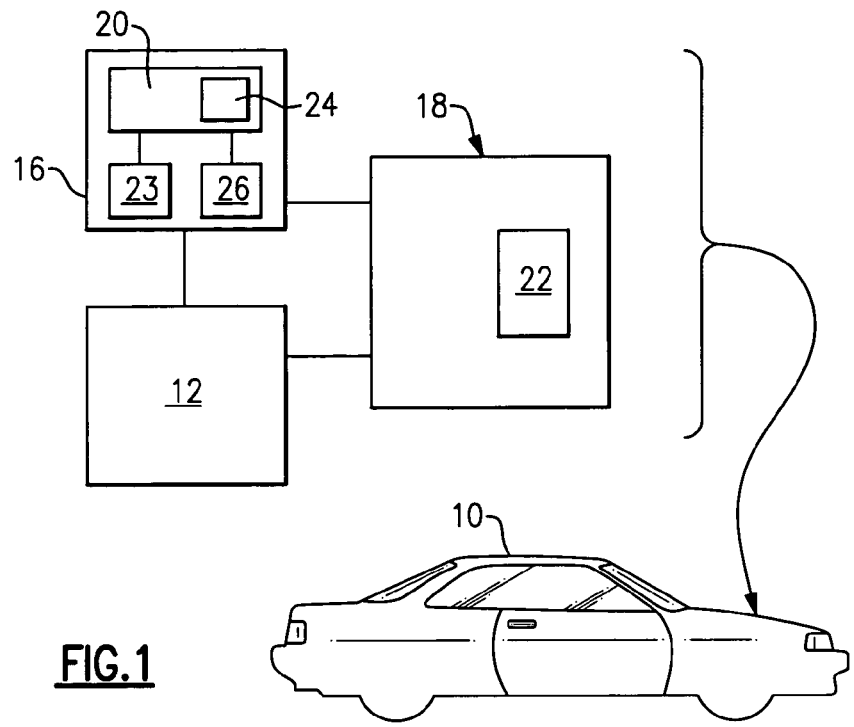
FIG. 1 is a schematic illustration of an example vehicle engine and intake manifold assembly using the sensor assembly of the present invention.

FIG. 1 illustrates a vehicle 10 having an engine 12 and an intake manifold system 16 connected to a fuel injection system 18. The intake manifold system 16 includes an engine actuator 20. An engine controller 22 within the fuel injection system 18 is connected to the engine actuator 20 to control air delivery to the engine 12.

The engine controller 22 directs the engine actuator 20 to operate valves 23 within the intake manifold 16 to modify the combustion in engine 12. In order to provide the engine 12 with a proper timing for fuel ignition the intake engine controller 22 needs to know information, such as the manifold air pressure and engine actuator 20 position. As the engine 12 speed and temperatures increases, airflow through the intake manifold 16 must be increased. When the speed and temperature of the engine 12 decrease, airflow through the intake manifold 16 must be decreased. The engine actuator 20 adjusts valves inside the intake manifold 16 to optimize air delivery characteristics at different engine speeds by modifying air delivery parameters such as intake manifold tuning length or intake air tumble characteristics. A sensor assembly 26 provides the engine actuator 20 with feedback regarding the position and speed of the valves 23 within the intake manifold 16.

Although the sensor assembly 26 is described as measuring the position of an engine actuator 20 the sensor assembly 26 may be used in other applications where determining the position of a device is required.

Figures 2, 4:
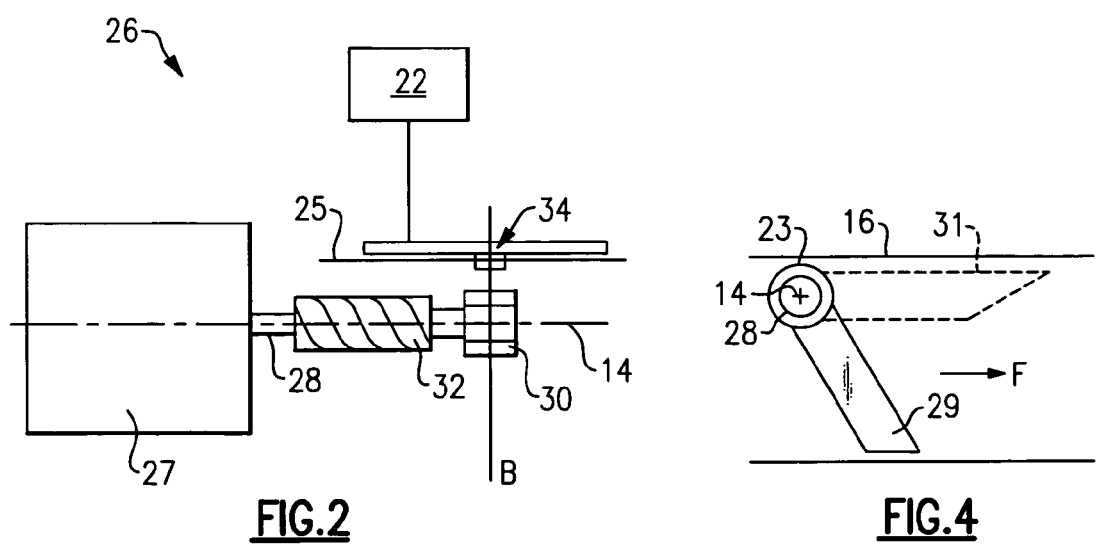
FIG. 2 is a schematic side view of an example sensor assembly of the present invention.
FIG. 4 illustrates opened and closed position of the valves within the intake manifold.

FIG. 2 illustrates the sensor assembly 26 of the present invention. The sensor assembly 26 is connected to an electric motor 27 of the engine actuator 20. The electric motor adjusts the location of the valves 23 within the intake manifold 16 through a gear train (not shown) and has an output shaft 28. A magnet 30 is mounted to the output shaft 28 and both the magnet 30 and output shaft 28 rotate about the same axis 14. In the example shown the magnet 30 is mounted to a worm gear 32 that is driven by the output shaft 28. Mounting the magnet 30 on the worm gear 32 provides an increased gear ratio over the output shaft 28 for better resolution by the sensor assembly 26. Each rotation of the output shaft 28 rotates the magnet 30 multiple rotations. In the example, the output shaft 28 rotates once for every one-hundred rotations of the worm gear 32, and thereby the magnet 30. The sensor assembly 26 is an increment sensor in that the number of magnet 30 rotations are counted by the sensor assembly 26 to determine the exact rotational position and speed of the output shaft 28. The example magnet 30 is a two-pole magnet.

A first Hall effect sensor 34 is spaced from the magnet 30 along an axis 25. By using a two-pole magnet the axis 25 of the first Hall effect sensor 34 can be parallel to the output shaft 28 and still be perpendicular to the magnetic field B created by the magnet 30, as required for desired operation of the first Hall effect sensor 34. As the output shaft 28 rotates the first Hall effect sensor 34 senses the rotation of the magnet 30. Each half rotation of magnet 30 is counted and this information is collected by a microcontroller 24 in the engine actuator 20. The microcontroller 24 interprets the position information to control location of the valves 23. Position information is also sent to the engine controller 22. The engine controller 22 interprets the position information and controls fuel ignition 18.

Because the first Hall effect sensor 34 is arranged parallel to the output shaft 28 less packaging room is required. Additionally, by using the two-pole magnet 30, an incremental sensor is provided saving both cost and space for the sensor assembly 26. With the parallel arrangement of the first Hall effect sensor 34 and the output shaft 28 only one Hall effect sensor 34 is required to obtain a clear reading of the rotation of the magnet 30.

Figure 3A:
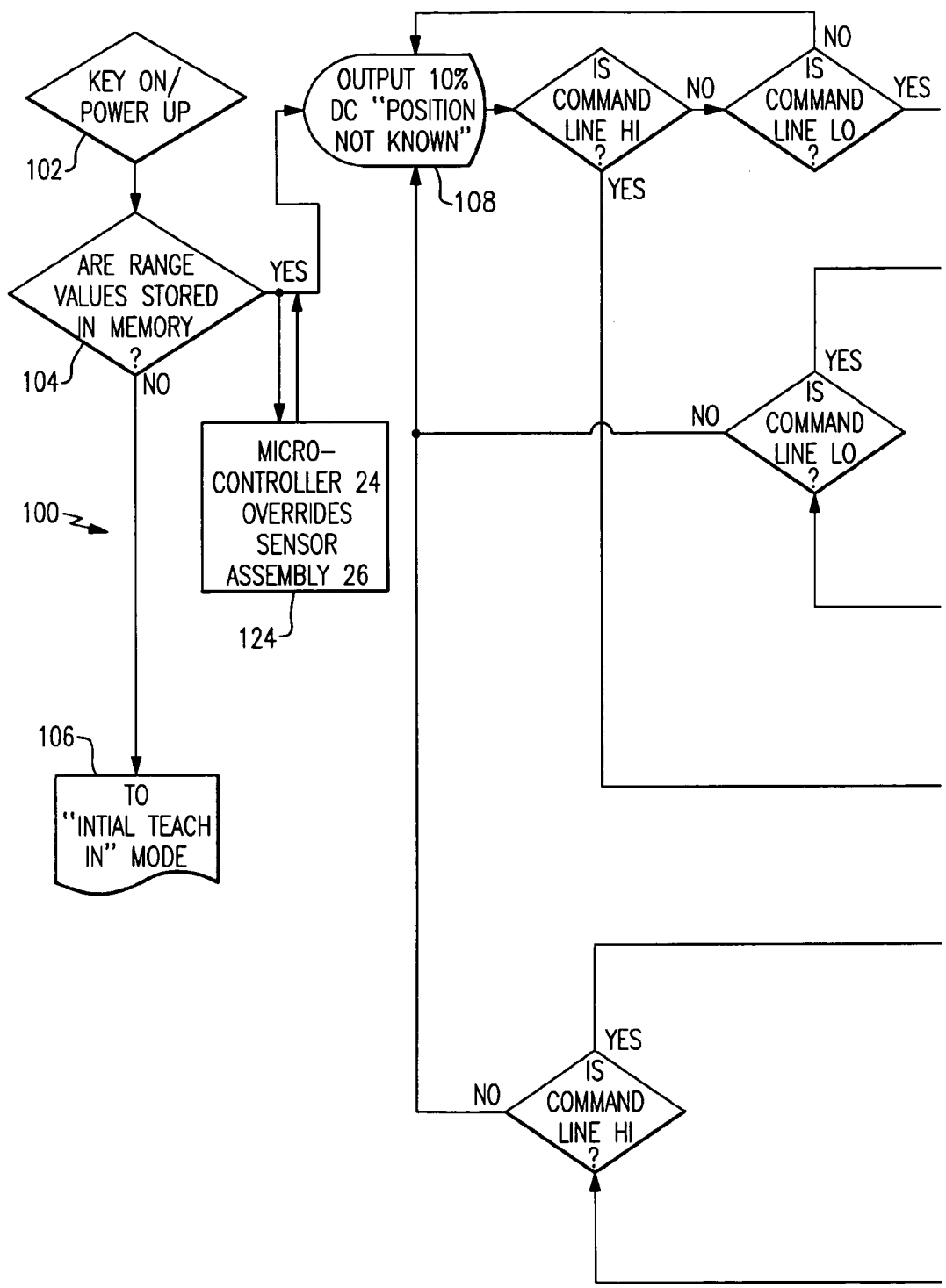
FIGS. 3A-3B is a flow diagram illustrating an example a method of initializing the sensor assembly according to the present invention.
Figure 3B:
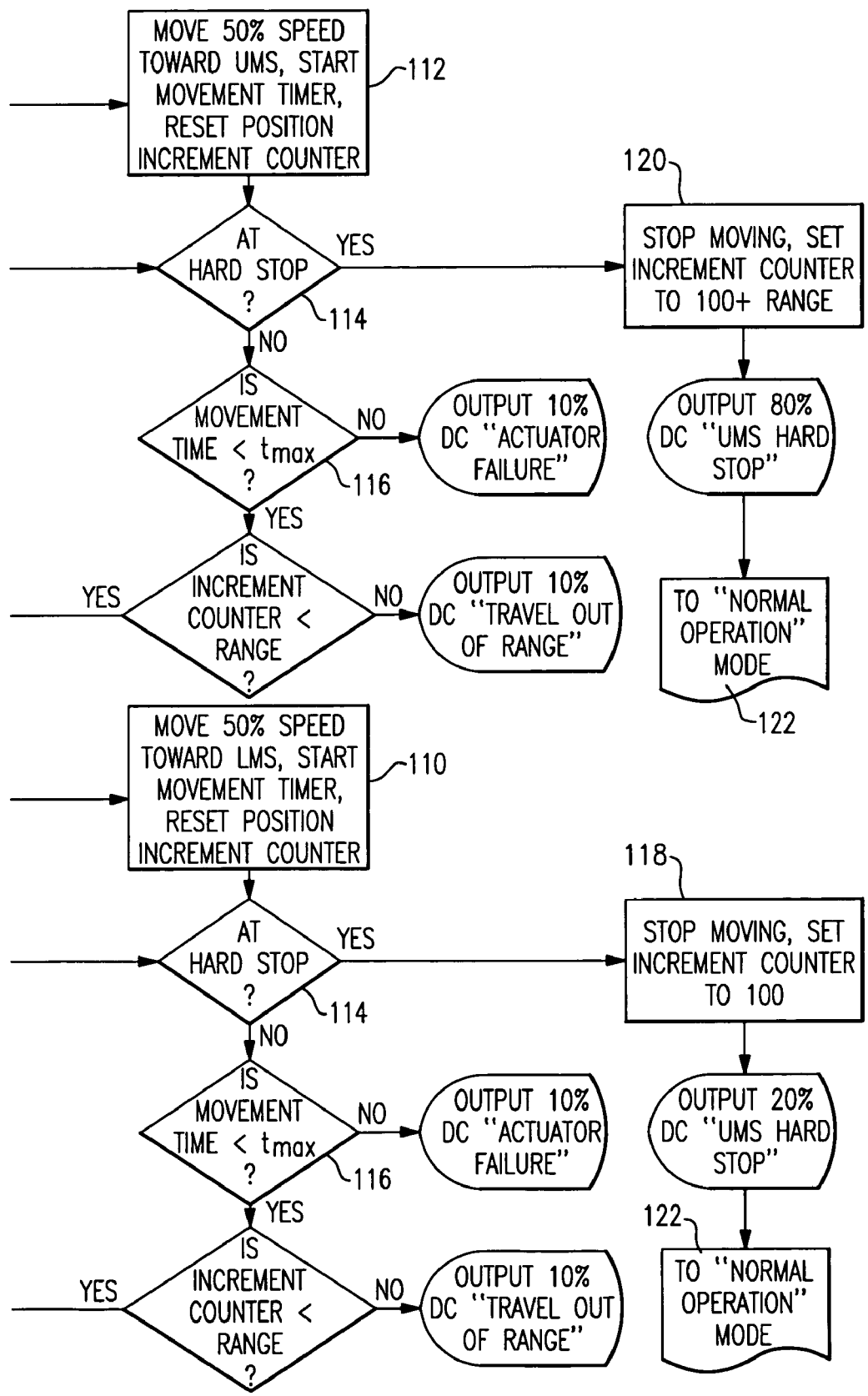

FIGS. 3A-3B illustrates a method 100 of initializing the sensor assembly 26. When the vehicle 10, is started power is provided to the sensor assembly 26 and the microcontroller 24, illustrated as step 102. The sensor assembly 26 determines whether or not the system has a previously stored memory 104. The absence of stored memory values indicates that the sensor assembly 26 is new and begins a learning mode 106. If there are memory values stored, the sensor assembly 26 inquires of the microcontroller 24 as to the last known position of the magnet 30, illustrated as step 108. The sensor assembly 26 cannot begin normal operations of counting increments until the magnet 30 is in a known position. Although the microcontroller 24 reports a last known position, a check to validate accuracy is used. Thus, the last know position is used to determine which direction that magnet 30 should be moved to reach a known stop position.

The electric motor 27 rotates the output shaft 28 to move the magnet 30 to the desired stop position. The magnet 30 is rotated at 50% of the normal revolution speed to reduce the risk of damage in the event of an unforeseen obstruction. FIG. 4 illustrates the valves 23 within the intake manifold 23. The valves 23 are correspondingly adjusted with the magnet 30, due to the connection to the engine actuator 20 and output shaft 28. The known stop position can correspond to a closed position 29 of the valves 23 where airflow F through the intake manifold 16 is stopped or slowed. The known stop position can also correspond to an open position 31 (illustrated in phantom) of the valves 23 where airflow F through the intake manifold 16 is at a maximum. Once the valves 23 reach the closed position or the open position further rotation of the output shaft 28 in that direction is prevented, creating a mechanical stop.

Using the example from above, the magnet 30 moves 100 revolutions for each rotation of the output shaft 28. If the count of revolutions is 50 or below the magnet is rotated backward to reach a lower mechanical stop position 110. If the count of revolutions is above 50 the magnet is rotated forward to reach an upper mechanical stop position 112. The magnet 30 is rotated until it reaches one of the known stop positions 114. A timer tracks the magnet 30 during this time to ensure that one of the known stop positions 114 is reached within a predetermined time period 116. If the magnet 30 is still moving after the predetermined time period 116 a system check is performed to determine if an error has occurred.

Once the magnet reaches one of the known stop positions 114, an increment counter is reset. If the magnet 30 is rotated backward to the lower mechanical stop position 110 the increment counter is reset to 100 range as indicated at 118. If the magnet 30 is rotated forward to the upper mechanical stop position 112 the increment counter is reset to 100+ range as indicated at 120. Once the increment counter is reset the sensor assembly 26 begins normal operation 122.

The sensor assembly 26 is connected to the microcontroller 24 and receives the last known position data from the microcontroller 24. Therefore, the microcontroller 24 can override initialization of the sensor assembly 26 when desired as indicated at 124. For example, when a vehicle engine 12 is at a predetermined temperature the microcontroller 22 can override initialization of the sensor assembly 26 temporarily to allow the valves 23 to reach desired positions. When an engine 12 is "hot" the valves 23 must move to "open" positions to increase airflow into the engine 12. Because the valves 23 and sensor assembly 26 are both driven by the output shaft 28, as the valves 23 move so does the sensor assembly 26. By overriding the sensor assembly 26 unnecessary movement required for initializing is saved. Once the valves 26 reach the desired position, and engine controller 22 removes the override 124 the sensor assembly 26 is initialized according to the example method.

Although a preferred embodiment of this invention has been disclosed, a worker of ordinary skill in this art would recognize that certain modifications would come within the scope of this invention. For that reason, the following claims should be studied to determine the true scope and content of this invention.

What is claimed is:

1. A method of initializing an increment sensor for an engine actuator comprising:
   a) determining a last known position of a magnet for the increment sensor;
   b) moving the magnet to a closer one of a plurality of known stop positions based upon data regarding a last known position of the magnet; and
   c) resetting an increment counter for the sensor once the magnet has reached one of the plurality of known stop positions.

2. The method of claim 1, wherein said step b) further includes rotating the magnet forward when closer to an upper stop position and rotating the magnet backward when closer to a lower stop position.

3. The method of claim 2, wherein said step b) further includes setting the upper stop position at the number of magnet rotations equal to one output shaft rotation.

4. The method of claim 1, wherein said step b) further includes obtaining the last known position of the magnet from an engine controller.

5. The method of claim 1, wherein said step c) further includes recording a count of the increment counter with an engine controller.

6. The method of claim 1, wherein said step b) further includes delaying rotation of the magnet when a vehicle engine is hot until a plurality of engine components have reached desired positions.

7. The method of claim 1, further comprising:
   d) initializing a system check if the magnet does not reach one of the plurality of stop positions within a predetermined time period.

8. The method of claim 1, wherein said step b) includes rotating the magnet at fifty percent of the regular operating speed of magnet rotation.

9. The method of claim 1, wherein said step b) includes moving the magnet at a portion of a normal magnet rotation speed.

10. A method of initializing an increment sensor for an engine actuator comprising:
   a) determining if a magnet for the increment sensor is in a known position;
   b) rotating a magnet forward when closer to an upper stop position and rotating the magnet backward when closer to a lower stop position based upon data regarding a last known position of the magnet; and
   c) resetting an increment counter for the sensor at an upper stop increment when the magnet has reached the upper stop position and resetting the increment counter at a lower stop increment when the magnet has reached the lower stop position.

11. The method of claim 10, wherein said step b) further includes setting the upper stop position at the number of magnet rotations equal to one output shaft rotation.

12. The method of claim 10, wherein said step b) further includes obtaining the last known position of the magnet from an engine controller.

13. The method of claim 10, wherein said step c) further includes recording a count of the increment counter with an engine controller.

14. The method of claim 10, wherein said step b) further includes delaying rotation of the magnet when a vehicle engine is hot until a plurality of engine components have reached desired positions.

15. The method of claim 10, further comprising:
   d) initializing a system check if the magnet does not reach one of the upper and lower stop positions within a predetermined time period.

16. A method of controlling a component comprising:
   a) determining a last known position of an increment sensor connected to an output of the component;
   b) determining which of a plurality of known stop positions is closer to the determined last known position;
   c) rotating the increment sensor in one of a first direction and a second direction toward a determined closer one of a plurality of known stop positions based upon data regarding the last known position of the increment sensor; and
   d) resetting an increment counter for the increment sensor once in one of the plurality of known stop positions.

17. The method of claim 16, wherein said step b) further includes setting an upper stop position equal to one rotation of the output shaft and setting a lower stop position equal to a zero rotation position of the output shaft.

18. The method of claim 16, wherein said step a) further includes obtaining the last known position of the increment sensor from the component.

19. The method of claim 16, wherein said step b) further includes delaying rotation of the increment sensor when a predetermined override condition of the component is fulfilled.

20. The method of claim 16, further comprising:
   d) initializing a system check if the increment sensor does not reach one of the plurality of stop positions within a predetermined time period.

* * * * *